(12) United States Patent
Downs et al.

(10) Patent No.: US 7,901,647 B2
(45) Date of Patent: Mar. 8, 2011

(54) ENHANCEMENT OF CONVENTIONAL SCR AND SNCR PROCESSES WITH AMMONIA DESTRUCTION CATALYST

(75) Inventors: William Downs, Alliance, OH (US); Larry A. Hiner, Orrville, OH (US); Xiaoyu Guo, Akron, OH (US)

(73) Assignee: Babcock & Wilcox Power Generation Group, Inc.

( * ) Notice: Subject to any disclaimer, the term of this patent is extended or adjusted under 35 U.S.C. 154(b) by 0 days.

(21) Appl. No.: 12/098,623

(22) Filed: Apr. 7, 2008

(65) Prior Publication Data

US 2009/0252665 A1    Oct. 8, 2009

(51) Int. Cl.
*B01D 53/56* (2006.01)
*B01D 53/58* (2006.01)

(52) U.S. Cl. ............... 423/235; 423/215.5; 423/242.1; 423/239.1; 423/237

(58) Field of Classification Search ............... 423/215.5, 423/242.1, 239.1, 237, 235
See application file for complete search history.

(56) References Cited

U.S. PATENT DOCUMENTS

| | | | |
|---|---|---|---|
| 4,220,633 A | 9/1980 | Pirsh | |
| 5,540,897 A | 7/1996 | Chu et al. | |
| 5,567,394 A * | 10/1996 | Chu et al. | 422/177 |
| 5,585,081 A * | 12/1996 | Chu et al. | 423/239.1 |
| 5,603,909 A * | 2/1997 | Varner et al. | 423/239.1 |
| 5,679,313 A * | 10/1997 | Nojima et al. | 423/237 |
| 6,080,376 A | 6/2000 | Iida et al. | |
| 6,620,393 B2 * | 9/2003 | Spokoyny | 423/237 |
| 6,863,875 B1 | 3/2005 | Kotake et al. | |
| 7,393,511 B2 * | 7/2008 | Tran et al. | 423/237 |
| 7,591,987 B1 * | 9/2009 | Kato | 423/237 |
| 2001/0041157 A1 * | 11/2001 | Spokoyny | 423/235 |
| 2003/0161772 A1 * | 8/2003 | Kikkawa et al. | 423/237 |
| 2003/0202927 A1 * | 10/2003 | Minkara et al. | 423/237 |
| 2004/0213720 A1 * | 10/2004 | Wolf et al. | 423/237 |
| 2006/0029534 A1 * | 2/2006 | Eiteneer et al. | 423/237 |
| 2006/0182676 A1 * | 8/2006 | Tran et al. | 423/239.1 |
| 2007/0110643 A1 * | 5/2007 | Sobolevskiy et al. | 422/177 |
| 2009/0087367 A1 * | 4/2009 | Liu et al. | 423/237 |

OTHER PUBLICATIONS

Wickham, D.T. and Lind, J.; Catalysts for the Selective Oxidation of Ammonia to Nitrogen and Water; SAE Technical Paper Series 2003-01-2333; 33rd International Conference on Environmental Systems (ICES), Vancouver, B.C., Canada, Jul. 7-10, 2003; Copyright © 2003 SAE International, 400 Commonwealth Drive, Warrendale, PA 15096-0001 U.S.A.

(Continued)

*Primary Examiner* — Timothy C Vanoy
(74) *Attorney, Agent, or Firm* — Eric Marich

(57) ABSTRACT

An apparatus and method for achieving increased $NO_x$ removal efficiency from an emissions control portion of a fossil fuel fired boiler while controlling ammonia slip provides excess levels of ammonia above those levels conventionally employed in SCR and/or SNCR applications. The apparatus and methods comprise, in part, use of a $NO_x$ reduction system comprising at least one selective catalytic reduction system which receives ammonia in higher amounts than conventional practice from an upstream ammonia injection point, and an ammonia reduction system positioned downstream of one or more ammonia injection points and the $NO_x$ reduction system. The excess ammonia achieves increased $NO_x$ removal, while the ammonia reduction system contains at least one ammonia destruction catalyst which permits the $NO_x$ reduction system to be operated at an increased $NO_x$ removal efficiency without a corresponding increase in ammonia slip.

12 Claims, 7 Drawing Sheets

OTHER PUBLICATIONS

Wickham, D.T., Engel, J. and Yu, J.; Development of a Pilot Scale Reactor for the Selective Oxidation of Ammonia to Nitrogen and Water; SAE Technical Paper Series 2004-01-2406; 34th International Conference on Environmental Systems (ICES), Colorado Springs, CO, Jul. 19-22, 2004; Copyright © 2004 SAE International, 400 Commonwealth Drive, Warrendale, PA 15096-0001 U.S.A.

Kitto, J.B. and Stultz, S.C., Editors, Steam/its generation and use, 41st Edition, Copyright © 2005, The Babcock & Wilcox Company, Barberton, Ohio, U.S.A., Chapter 34—Nitrogen Oxides Control, pp. 34-1 through 34-9.

Wickham, David; Engel, Jeffrey; Yu, Jianhan; Nalette, Tim; Thibaud-Erkey, Catherine; and Quinn, Gregory; Results of VPCAR Pilot Scale and System Level Tests for the Selective Oxidation of Ammonia to Nitrogen and Water; SAE Paper No. 2005-01-3034; 35th International Conference on Environmental Systems, Rome Italy, Jul. 1-14, 2005 ; Copyright © 2005 Society of Automotive Engineers, Inc.

* cited by examiner

ENHANCEMENT OF CONVENTIONAL SCR AND SNCR PROCESSES WITH AMMONIA DESTRUCTION CATALYST

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus having an increased efficiency in the ability to control the emission of $NO_x$ without a simultaneous increase in the amount of ammonia slip.

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique is selective catalytic reduction using an apparatus generally referred to as a selective catalytic reactor or simply as an SCR.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. The function of the SCR system is to react $NO_x$ with ammonia ($NH_3$) and oxygen to form molecular nitrogen and water. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

Selective non-catalytic reduction, SNCR, is a related technology where ammonia and $NO_x$ react in a homogeneous gas phase environment to produce molecular nitrogen and water vapor. This system must operate at higher temperatures than the SCR systems. Typical operating temperatures range from 1800° F. down to 1500° F. This technology is generally applied to fluidized bed combustion applications that produce highly alkaline fly ashes. The ammonia slip in these applications is generally higher than it is in SCR applications.

For additional details concerning $NO_x$ removal technologies used in the industrial and power generation industries, the reader is referred to *Steam/its generation and use*, 41st Edition, Kitto and Stultz, Eds., Copyright© 2005, The Babcock & Wilcox Company, Barberton, Ohio, U.S.A., particularly Chapter 34—Nitrogen Oxides Control, the text of which is hereby incorporated by reference as though fully set forth herein.

Recent regulations (March 2005) issued by the EPA promise to increase the portion of utility boilers equipped with SCRs. SCRs are generally designed for a maximum efficiency of about 90%. This limit is not set by any theoretical limits on the capability of SCRs to achieve higher levels of $NO_x$ destruction. Rather, it is a practical limit set to prevent excessive levels of ammonia slip. This problem is explained as follows.

In an SCR, ammonia reacts with $NO_x$ according to one or more of the following stoichiometric reactions (a) to (c):

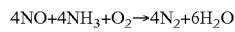

$$4NO + 4NH_3 + O_2 \rightarrow 4N_2 + 6H_2O \qquad (a)$$

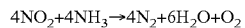

$$4NO_2 + 4NH_3 \rightarrow 4N_2 + 6H_2O + O_2 \qquad (b)$$

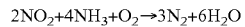

$$2NO_2 + 4NH_3 + O_2 \rightarrow 3N_2 + 6H_2O \qquad (c).$$

The above reactions are catalyzed using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Base metal catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carry-over to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_x$, these catalysts can also act as oxidizing catalysts, converting CO to $CO_2$ under proper temperature conditions. However, $SO_2$ oxidation to $SO_3$ and high material costs often make precious metal catalysts less attractive.

As is known in the art, the concern about ammonia slip is not particularly a matter of costs of ammonia. The problem with ammonia slip is that it is increasingly unacceptable to the utility customer. Ammonia slip is a precursor to air heater fouling and direct $PM_{2.5}$ emissions at the stack. It can even affect the salability of the fly ash for use in cement.

For coal fired boilers the principal problem arises from the reaction of ammonia with $SO_3$ to form ammonium bisulfate. Ammonium bisulfate is a salt of a strong acid and weak base and is therefore acidic. Ammonium bisulfate has a relatively high dew point (approximately 350° F. to over 450° F.), as shown in FIG. 1. The melting point of ammonium bisulfate is about 297° F. So, any surface temperatures in the air heater hotter than about 297° F. and colder than the ammonium bisulfate dew point will attract deposits of acidic, liquid ammonium bisulfate. This acidic sticky substance will accumulate fly ash and produce deposits that are difficult to remove.

Currently SCRs are typically operated at low ammonia slips (e.g., less than or equal to about 2 ppm). However, with increasing ammonia slip various undesirable compounds will be generated potentially causing problems in downstream equipment and/or increased stack opacity.

Another problem associated with ammonia slip involves the particulate control device (e.g., an electrostatic precipitator). For example, problems have been observed with ammonia evolving from fly ash collected in the hoppers of the particulate collection device and subsequently used as fillers in cement. Eastern bituminous coal ashes tend to be acidic and therefore are unlikely to give off an ammonia odor, particularly in the face of the fact that the threshold odor concentration of ammonia is about 17 ppm. However, if these ashes accumulate ammonia under acid conditions, they could easily reverse the reaction when exposed to the alkaline conditions in cement.

The final fate of ammonia is perhaps the most problematic of all. If ammonia proceeds all the way to the wet scrubber in its vapor phase, then as soon as the flue gas is quenched to below about 180° F., ammonium bisulfite will form due to the presence of $SO_2$ and water vapor. This ammonium bisulfite will form as a submicron aerosol that will not be captured in the wet scrubber. It will be discharged as a fine $PM_{2.5}$ particulate and will persist for several miles downwind as a visible plume. For example, one ppm of ammonium bisulfite aerosol produces an obscuration of about 1% across a path length of 10 feet.

Given the above, a need exists for a method that provides for increased removal efficiency of $NO_x$ without increasing the amount of ammonia slip, and without suffering, for example, from the drawbacks of ammonium bisulfate formation, ammonia laden fly ash, and ammonium bisulfite formation.

SUMMARY OF THE INVENTION

The present invention has applicability to a wide range of processes and/or systems including, but not limited to, SCR systems, SNCR systems and combinations thereof. Among its various benefits, there are several advantages obtained through its use.

1. For existing SCR installations where the catalyst activity has begun to degrade, the present invention allows the plant operator to increase the ammonia supply rate and achieve increased $NO_x$ removal, without increasing ammonia slip. $NO_x$ performance can be maintained at required levels resulting in less downtime and longer-lived catalyst by simply increasing the ammonia flow rate.

2. Variations in the local ammonia to $NO_x$ ratio at the inlet become less critical. Therefore, the premixing stage called static mixing can be scaled back or in some instances eliminated. Since most SCRs are currently retrofitted into existing tight spaces, there is significant advantage to eliminating the need for the relatively large space required of static mixing. Similar advantages are available in new construction, since the present invention provides the designer greater flexibility, and initial capital costs for the SCR installation are thus reduced. Operating costs are also reduced, since the reduced flue gas side pressure drop is less, requiring less fan power to convey the flue gas through the system.

3. Less catalyst is required to achieve the same level of $NO_x$ abatement.

4. Significantly, the present invention "breaks the glass ceiling" traditionally believed to limit SCR $NO_x$ removal effectiveness. The SCR can be operated at higher efficiencies (higher than the usual 90% imposed by the conventional SCR design) allowing the plant operator to increase $NO_x$ removal efficiency to higher values, perhaps to as high as 95% to 98%.

5. The present invention reduces the ammonia content within fly ash to such a level that the fly ash is suitable for use in various industries and/or applications.

The present invention solves the aforementioned problems by providing a method having an increased efficiency and flexibility in the ability to control the emission of $NO_x$ without a simultaneous increase in the amount of ammonia slip. The present invention provides this increased efficiency and flexibility by operating the SCR in a manner different than is typically employed in the art, by increasing the amount of ammonia added to the SCR to higher than conventional levels (indeed, to a level necessary to achieve a desired $NO_x$ removal efficiency from the SCR and/or SNCR systems present) and then using an ammonia destruction catalyst to achieve the increased $NO_x$ removal without increasing the amount of ammonia slip.

In accordance with the present invention, an ammonia destruction catalyst is placed at a point downstream of the ammonia injection point in a $NO_x$ emission control system utilizing an SCR and/or an SNCR. The ammonia destruction catalyst may be placed between the SCR and/or SNCR and the air heater if the potential for ammonium bisulfate formation exists. Otherwise, the ammonia destruction catalyst may be placed at any point downstream of the SCR and/or SNCR. Since the ammonia destruction catalyst is downstream of the $NO_x$ reduction means, the method of the present invention permits the use of an increased stoichiometric ratio of ammonia to $NO_x$ to improve the operation and performance of the SCR and/or SNCR, allowing operation at increased $NO_x$ removal efficiency without a corresponding increase in ammonia slip.

In accordance with the present invention the ammonia destruction catalyst can be placed between the point of ammonia injection at a temperature suited to selective non-catalytic reduction of $NO_x$ and the discharge of these flue gases at the stack.

Accordingly, one aspect of the present invention is drawn to a method for achieving increased $NO_x$ removal efficiency in an emissions control system using an excess of an ammoniacal compound while controlling the amount of ammonia slip, the method comprising the steps of: (a) providing a conduit for conveying combustion exhaust gases from a combustion source to a discharge point; (b) contacting the combustion exhaust gases with at least one ammoniacal compound via one or more injection points at an amount sufficient to provide a suitable ammonia to $NO_x$ stoichiometric ratio to provide an increased efficiency in the removal of $NO_x$ to yield a treated combustion exhaust gas stream, wherein the one or more injection points are located between the combustion source and the discharge point; and (c) bringing the treated combustion exhaust gas stream into contact with at least one ammonia destruction catalyst, wherein the ammonia destruction catalyst is located between the one or more ammoniacal compound injection points and the discharge point.

Another aspect of the present invention is drawn to a method for achieving increased $NO_x$ removal efficiency in an emissions control system for a boiler using an excess of an ammoniacal compound while controlling the amount of ammonia slip, the method comprising the steps of: providing a flue for conveying flue gases from the boiler to a stack for discharge; providing at least one selective catalytic reduction (SCR) system for removing $NO_x$ from the flue gases along the flue between the boiler and the stack, the SCR system relying in whole, or in part, upon at least one ammoniacal compound introduced via at least one ammoniacal compound injection point which provides an increased stoichiometric ratio of ammonia to $NO_x$ to increase $NO_x$ removal by the SCR system; and positioning an ammonia reduction system downstream of the SCR system, wherein the ammonia reduction system contains at least one ammonia destruction catalyst which permits the SCR system to be operated at the increased stoichiometric ratio of ammonia to $NO_x$ to achieve increased $NO_x$ removal without a corresponding increase in ammonia slip.

In yet another aspect of the present invention, there is provided a method for continuously controlling $NO_x$ removal efficiency in an emissions control system for a boiler in response to changes in the boiler operating parameters while controlling ammonia slip, the method comprising the steps of: providing a flue for conveying flue gases from the boiler to a stack for discharge; positioning a $NO_x$ reduction system along the flue between the boiler and the stack, the $NO_x$ reduction system being constructed so as the remove at least $NO_x$ from the flue gas along the flue, wherein the $NO_x$ reduction system relies in whole, or in part, upon ammonia introduced into the $NO_x$ reduction system via at least one ammoniacal compound injection point; varying, in response to the changes in boiler operating parameters, a stoichiometric ratio of ammonia to $NO_x$ introduced into the $NO_x$ reduction system to achieve a desired level of $NO_x$ removal regardless of the amount of ammonia slip from the $NO_x$ reduction system; and positioning an ammonia reduction system downstream of the $NO_x$ reduction system, wherein the ammonia reduction system contains at least one ammonia destruction catalyst and the ammonia destruction catalyst permits the $NO_x$ reduction system to be operated to achieve a desired level of $NO_x$ removal without a corresponding increase in ammonia slip downstream of the ammonia reduction system.

In still another aspect of the present invention, there is provided a method for achieving increased $NO_x$ removal efficiency in an emissions control system for a boiler while controlling ammonia slip, the method comprising the steps of: providing a flue for conveying flue gases from the boiler to a stack for discharge; positioning a $NO_x$ reduction system comprising at least one selective catalytic reduction system along the flue between the boiler and the stack, the $NO_x$ reduction system being constructed so as the remove at least $NO_x$ from the flue gas conveyed along the flue, wherein the $NO_x$ reduction system relies in whole, or in part, upon ammonia introduced into the $NO_x$ reduction system via at least one ammoniacal compound injection point; determining a desired $NO_x$ removal efficiency for the at least one selective catalytic reduction system and providing an excess stoichiometric ratio of ammonia to $NO_x$ to achieve the desired $NO_x$ removal efficiency regardless of the amount of ammonia slip from the $NO_x$ removal system that would otherwise be produced; and positioning an ammonia reduction system downstream of the one or more selective catalytic reduction systems, wherein the ammonia reduction system contains at least one ammonia destruction catalyst and the ammonia destruction catalyst permits the one or more selective catalytic reduction systems to be operated at the excess stoichiometric ratio of ammonia to $NO_x$ to achieve increased $NO_x$ removal efficiency without a corresponding increase in ammonia slip downstream of the ammonia reduction system.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
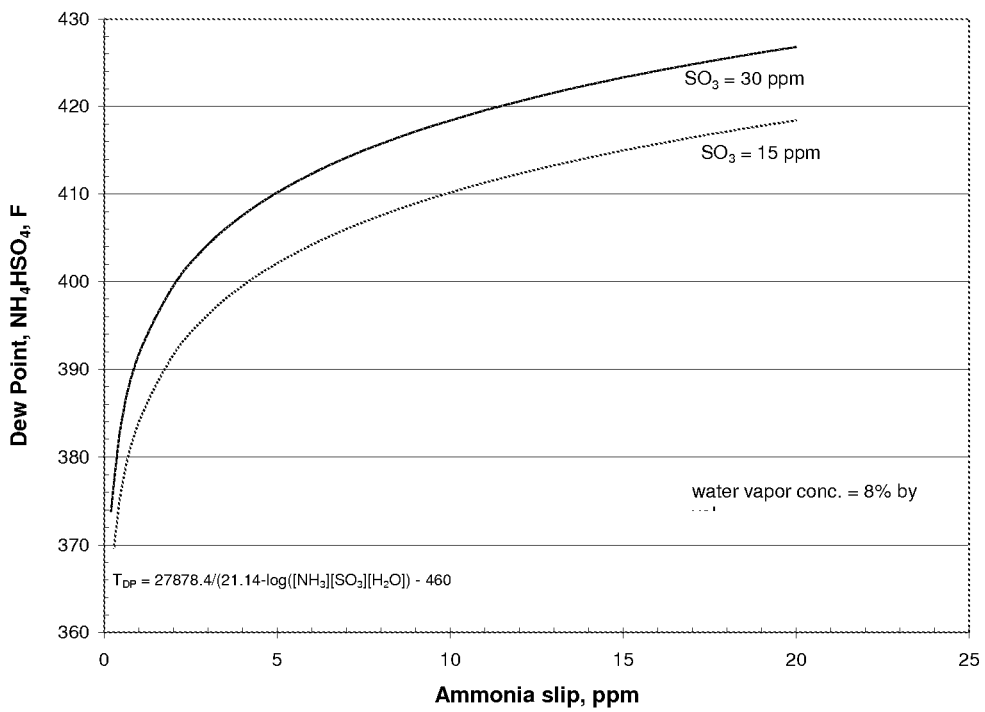
FIG. 1 is a graph illustrating the dew point of ammonium bisulfate as a function of ammonia slip.

While the present invention will be described in terms of SCR and/or SNCR systems which use ammonia as the $NO_x$ reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness.

Although the present invention is described in relation to a boiler, or a fossil fuel boiler, it is not limited solely thereto. Instead, the present invention can be applied to any combustion source that generates $NO_x$ regardless of whether such a combustion source is utilized in conjunction with a boiler, or a steam generator. For example, the present invention could be used in combination with a kiln, a heater, or any other type of combustion process that generates, in whole or in part, a flue gas or combustion gas containing $NO_x$. Accordingly, the description below is to be construed as merely exemplary.

The basis for this invention has its root in the recent discovery that the design equation widely used throughout the world to size selective catalytic reactors (SCR) for the electric utility industry is flawed. That flaw will be described as follows.

The kinetic expression for the reaction rate between $NO_x$ and $NH_3$ as identified by Reaction (a) above is:

$$-\frac{dC_{NO_x}}{dt} = \kappa C_{NO_x}^a C_{NH_3}^b \tag{1}$$

where κ equals the reaction rate constant; $C_{NO_x}$ equals the bulk gas phase concentration of $NO_x$; $C_{NH_3}$ equals the bulk gas phase concentration of ammonia; and a, b equal constants denoting the order of reaction.

During the past 30-plus years that SCRs have been employed throughout the world for $NO_x$ control from fossil fuel fired boilers the reaction order for $NO_x$ has been assumed to be first order, i.e., a=1. For reasons that are not all together clear, over this same time period the order of the reaction for ammonia has been assumed to be zero, i.e., b=0. Perhaps because of the fear of ammonia slip, the stoichiometric ratio of ammonia to $NO_x$ at the SCR has been generally a fixed value of 0.9 for the majority of SCR applications. Under these conditions, the ammonia concentration in relation to the $NO_x$ concentration would appear to be a constant and the overall rate expression would simplify to:

$$-\frac{dC_{NO_x}}{dt} = \kappa' C_{NO_x} \tag{2}$$

$$-\int_{C_{NO_{x_{in}}}}^{C_{NO_{x_{out}}}} \frac{dC_{NO_x}}{C_{NO_x}} = \kappa' \int_0^t dt \tag{3}$$

$$= \ell n\left[\frac{C_{NO_{x_{out}}}}{C_{NO_{x_{in}}}}\right] = \kappa' t \tag{4}$$

$$\mathit{eff} = 1 - e^{-\kappa' t} \tag{5}$$

This Equation (5) resembles the Deutsch-Anderson relationship used to design electrostatic precipitators. This expression implies that the SCR performance varies only with residence time. Other properties such as catalyst type, catalyst activity, diffusion coefficients, etc., would be lumped into the proportionality constant, κ'. Since the differential equation (2) is a first order equation it is not unexpected that performance of the SCR is independent of the entering $NO_x$ concentration. However, Equation (2) is problematic from the standpoint that it implies that the performance of an SCR is unaffected by the amount of ammonia added.

Researchers have recently reexamined the basic kinetic relationships of Reaction (a) and have shown that the reaction kinetics for $NO_x$ destruction follow a relationship as follows:

$$-r_{NO} = \frac{k_{NO} K_{NH_3} C_{NO} C_{NH_3}}{1 + K_{NH_3} C_{NH_3}} \tag{6}$$

where: $k_{NO}$ equals the =Forward reaction rate for Reaction (a), $K_{NH_3}$ equals the Equilibrium constant for Reaction (a).

For $NO_x$ and ammonia concentrations in the usual range of 100 to 500 ppm the denominator in this expression approaches unity. Therefore, the reaction can be described adequately as being of first order in both $NO_x$ and ammonia. If the stoichiometry is set to 1.0 then $C_{NO} = C_{NH_3}$ and Equation (1) becomes:

$$-\frac{dC_{NO_x}}{dt} = \kappa''(C_{NO_x})^2 \tag{7}$$

The design of selective catalytic reactors approaches the ideal reactor description of a plug flow reactor. Thus, applying Equation (1) to a plug flow reactor model yields:

$$\mathit{eff} = \frac{\kappa'' C_{NO_{x_{in}}} \tau}{1 + \kappa'' C_{NO_{x_{in}}} \tau} \tag{8}$$

where κ" equals a constant that includes the activity and surface area of the catalyst (i.e., the reaction rate constant);

$$C_{NO_{x_{in}}}$$

is the initial or entering $NO_x$ concentration; and τ is the residence time of flue gas in the SCR.

If the ratio of ammonia to $NO_x$ differs from unity, then the expression of $NO_x$ efficiency is more complex. Expressing the molar stoichiometry of ammonia to $NO_x$ at the SCR inlet as $$M = \frac{C_{NH_{3_{in}}}}{C_{x_{in}}}$$

yields:

$$\mathit{eff} = \frac{M\left(e^{(1-M)\kappa'' C_{NO_{x_{in}}} \tau} - 1\right)}{e^{(1-M)\kappa'' C_{NO_{x_{in}}} \tau} - M} \tag{9}$$

where M≠1. Given the above, Equation (9) works for all values of M with the exception of 1.0. Ammonia slip is the difference between the ammonia added and the ammonia reacted. Thus:

$$\alpha_{slip} = (M - \mathit{eff}) C_{NO_{x_{in}}} \tag{10}$$

Any "real" SCR can be thought of as a multiplicity of ideal plug flow reactors operating in parallel. The $NO_x$ emissions from each ideal reactor would obey the following relationship:

$$C_{NO_{x_{out}},i} = C_{NO_{x_{in}},i}\left[1 - \frac{M_i\left(e^{(1-M_i)\kappa_i'' C_{NO_{x_{in}},i} \tau_i} - 1\right)}{e^{(1-M_i)\kappa_i'' C_{NO_{x_{in}},i} \tau_i} - M_i}\right] \tag{11}$$

where i represents each channel in an array of channels in a plate or honeycomb catalyst Each of the primary variables, $$M_i, C_{NO_{x_{in}}, i}, \kappa_i'',$$

and $\tau_i$ are subject to variation. The $NO_x$ concentration and flow rate varies both spatially and temporally. This fact is the most difficult problem confronting the operator of any selective catalytic reactor to control $NO_x$. These variations require that the ammonia injection system either match these variations in $NO_x$ concentration and flow rate or provide means to minimize the effect of these variations. The technology most commonly employed by electric utilities to ameliorate this particular problem is "static mixing". The ammonia injection grids are placed upstream of the static mixers. After the ammonia is injected into the flue gas, the gases pass through the static mixers where hopefully the flue gas and ammonia are mixed homogenously. The target mixing quality of the static mixers is to achieve less than 5% variability in M expressed as the root mean square, RMS, in the stoichiometric ratio, M. If the goal is to keep ammonia slip below 2 ppm, even this 5% RMS is problematic. In addition to imperfect mixing, these static mixers create flue gas side pressure drop which impedes the flow of the flue gas and requires the expenditure of additional energy (through additional fan power), thus lowering the efficiency of power production.

Typically, $NO_x$ concentrations at any specific position in a flue will vary about ±10% on a continuing basis. The ammonia injection system controls do not specifically try to match this moment to moment variation but rather tries to match the slower up and down variations. This short term variation will result in moment to moment variations in M both temporally and spatially.

Variations in the residence time, $\tau$, occur on both short term and long term bases. Variations in the velocity profile entering the SCR are fairly extreme because most SCRs installed on US electric utility boilers have been retrofitted in tight, difficult circumstances where normal efforts to flatten the velocity profile with baffles, turning vanes, and perforated plates have been only partially successful. RMS variations in the velocity profile entering an SCR are typically around 15%. Since the length of all channels in an SCR are equal, the residence time will vary in direct inverse proportion to flue gas velocity but with an RMS somewhat smaller than the velocity RMS. The somewhat self-correcting feature of the SCR is the fact that each parallel channel operates at the same pressure drop. Thus, the flue gas flow will self-correct to some extent to accommodate this fact.

The reaction rate constant, $\kappa''$, is the one variable that does not change in a dynamic way except for its dependence on temperature. Typically, the moment to moment variations in the temperature are less than 5° F. and the spatial variations are within about ±20° F. The temperature dependence of $\kappa''$ is described by the following general expression:

$$\kappa'' / \kappa_{ref}'' = c_1 e^{-c_2(T+460)} \quad (12)$$

The catalyst activity also degrades over time due to such factors as erosion, poisoning, pluggage, etc. These are long term trends that cause deactivation over time scales of months to years. Reduction in catalyst activity can be expected to decrease by 15 to 50% over a period of 10,000 hours. The more severe case of catalyst degradation results from poisoning effects, with the less severe degradation resulting from mechanical and erosive losses.

Increasing the ammonia to $NO_x$ ratio, (M), can be used as a strategy to ameliorate most problems that confront the performance of an SCR system for $NO_x$ control. This is the essential feature of this invention. Once the operator of an SCR recognizes that even degraded catalyst can be made to operate more efficiently by increasing the ammonia to $NO_x$ ratio many options are available to that operator. These advantages include: (1) The SCR can be operated at higher efficiencies (higher than the usual 90% imposed by the conventional SCR design); (2) Less catalyst is required to achieve the same level of $NO_x$ abatement; (3) As catalyst degrades over time, $NO_x$ performance can be maintained at required levels resulting in less downtime and longer-lived catalyst by simply increasing the ammonia flow rate; and (4) Variations in the local ammonia to $NO_x$ ratio at the inlet become less critical. Therefore, the premixing stage called static mixing can be scaled back or in some instances eliminated. Since most SCRs are currently retrofitted into existing tight spaces, there is significant advantage to eliminating the need for the relatively large space required of static mixing.

Figure 2:
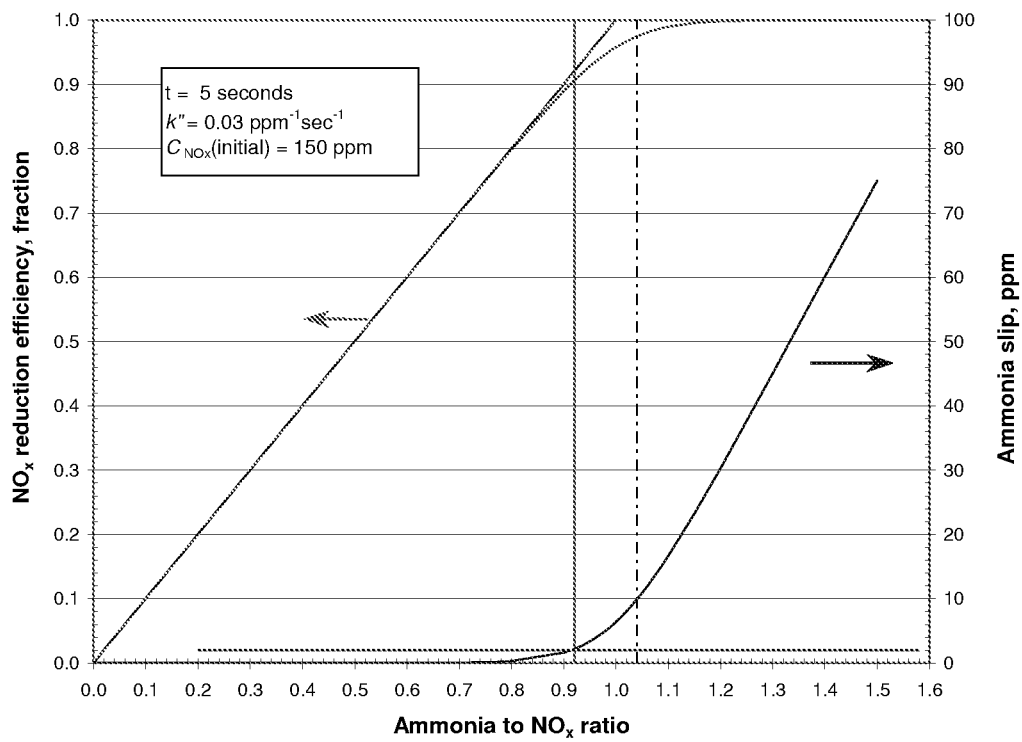
FIG. 2 is a graph illustrating the tradeoff between ammonia slip and $NO_x$ reduction across an ideal SCR designed to achieve 90% $NO_x$ reduction with a slip of 2 ppm ammonia.

FIG. 2 is a plot that illustrates the tradeoff between ammonia slip and $NO_x$ reduction across an ideal SCR designed to achieve 90% $NO_x$ reduction with 2 ppm of ammonia slip. As would be apparent to those skilled in the art, the observed efficiency of an SCR is actually slightly less than the theoretical efficiency based on the stoichiometric reactions shown above.

FIG. 2 relates to the situation where $\tau$ equals 5 seconds, $\kappa''$ equals 0.003 ppm$^{-1}$ sec$^{-1}$; and $$C_{NO_{x_{in}}}$$

equals 150 ppm (dry basis at 3% excess $O_2$) at the SCR inlet. As is shown in FIG. 2, by increasing the ammonia stoichiometry from 0.92 to 1.04, the ammonia slip would increase from 2 ppm to 10 ppm and the efficiency would increase from 90% to 97.4% (see the two vertical lines of FIG. 2). So, if the inlet $NO_x$ is 150 ppm, then the outlet $NO_x$ would be reduced from 15 ppm to 3.9 ppm, a decrease of 11.1 ppm. The ammonia addition would increase by 18.0 ppm. The 18.0 ppm value comes from the difference in (1.04−0.92)×150 ppm=18 ppm (one ppm ammonia reacts with one ppm $NO_x$).

If an SCR is working at design capacity and is performing all functional specification, the ammonia flow can be increased to improve performance to say 97.4%, as illustrated in FIG. 2. This would cause the ammonia slip to rise to 10 ppm. Assuming that a $NO_x$ allowance has a value of $3000 per ton of $NO_x$, then each increment of $NO_x$ captured will have a market value of about $69/pound mole of $NO_x$. Assuming that ammonia costs $500 per ton, the ammonia cost would be $4.25/pound mole of $NH_3$. Then, the cost benefit of increasing the ammonia consumption to earn extra $NO_x$ allowances would be:

($69/lb mole $NO_x$ × 11.1 lb moles $NO_x$/10$^6$ lb moles flue gas) −

($4.25/lb moles $NH_3$ × 18 lb moles $NH_3$/10$^6$ lb moles flue gas) =

$689.4/10$^6$ lb moles flue gas.

If, for example, a 100 Mw power plant burning high volatile coal had a plant heat rate of 9000 Btu/kwhr that power plant would emit about 26,300 pound moles of dry flue gas per hour. The revenue generated by operating at the higher $NO_x$ efficiency would be $\$689.40/10^6$ pound moles×26,300 pound moles/hr=$18.13/hr or about 0.01813¢/kwhr.

Figure 3:
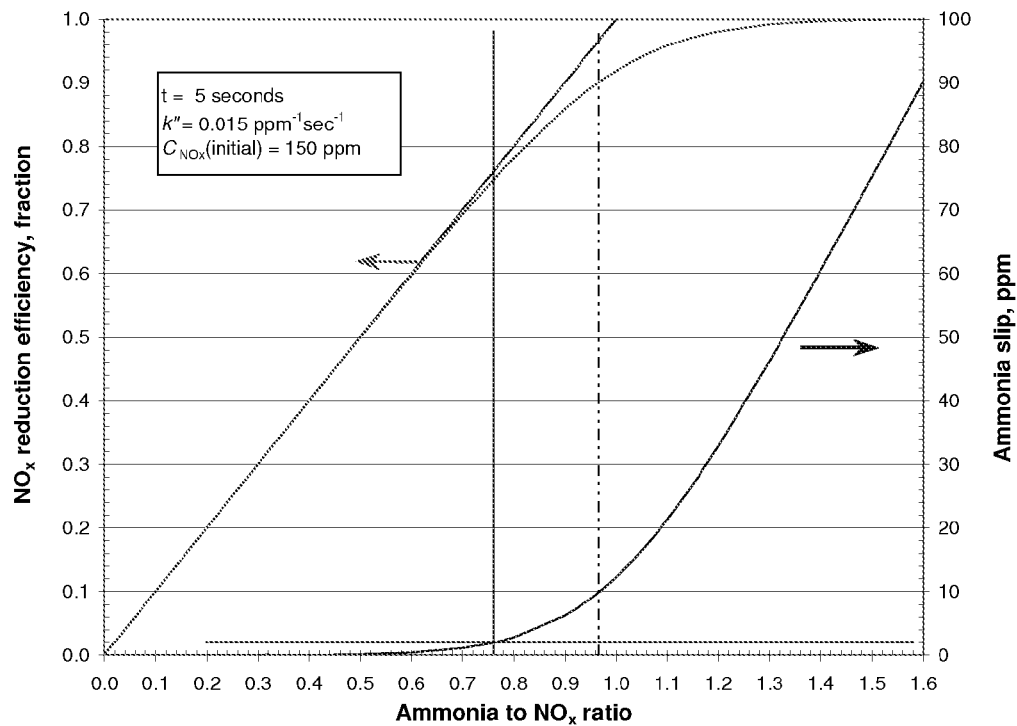
FIG. 3 is a graph illustrating the tradeoff between ammonia slip and $NO_x$ reduction across an ideal SCR where the catalyst activity has degraded 50%.

Looking at the situation where the catalyst activity has degraded by 50% over time, the following analysis applies. In our example the residence time, τ, is still 5 seconds and the inlet $NO_x$ concentration is still 150 ppm. However, the activity, κ", has diminished by 50% from 0.03 to 0.015. Using Equation 9 again, if the ammonia is adjusted downward to maintain 2 ppm slip, then the $NO_x$ removal will drop from 90% to about 75%. As a result, the ammonia flow would have had to been dropped from 0.92 to about 0.75 moles ammonia per mole $NO_x$. Without that adjustment, ammonia slip would have risen from 2 ppm to about 7 ppm. This is illustrated in FIG. 3. If the utility were to operate the SCR at this 75 percent efficiency they would have to purchase $NO_x$ allowances to cover the 22.5 ppm $NO_x$ being emitted above their allowed amount. For this 100 Mw power plant the costs would be about \$69/lb mole×22.5 lb moles/$10^6$ moles flue gas×26,300 lb moles/hr or \$40.83/hr. Based on the cost of electricity, this cost would be about 0.0408¢/kwhr.

But if the ammonia flow is adjusted (increased) to maintain the 90% efficiency, the stoichiometry will increase to 0.96 and the ammonia slip will increase to approximately 10 ppm. The cost of ammonia to avoid the above loss would be only \$4.25/lb mole×150 moles $NO_x/10^6$ moles flue gas×(0.96−0.76)×26,300 lb moles flue gas per hour=\$3.35/hr for the cost of ammonia. The net savings is \$40.83−\$3.35=\$37.48/hr.

To increase the efficiency to say, 97%, would require that the ammonia stoichiometry increase to about 1.16 where the ammonia slip would grow to about 28 ppm.

Figure 4:
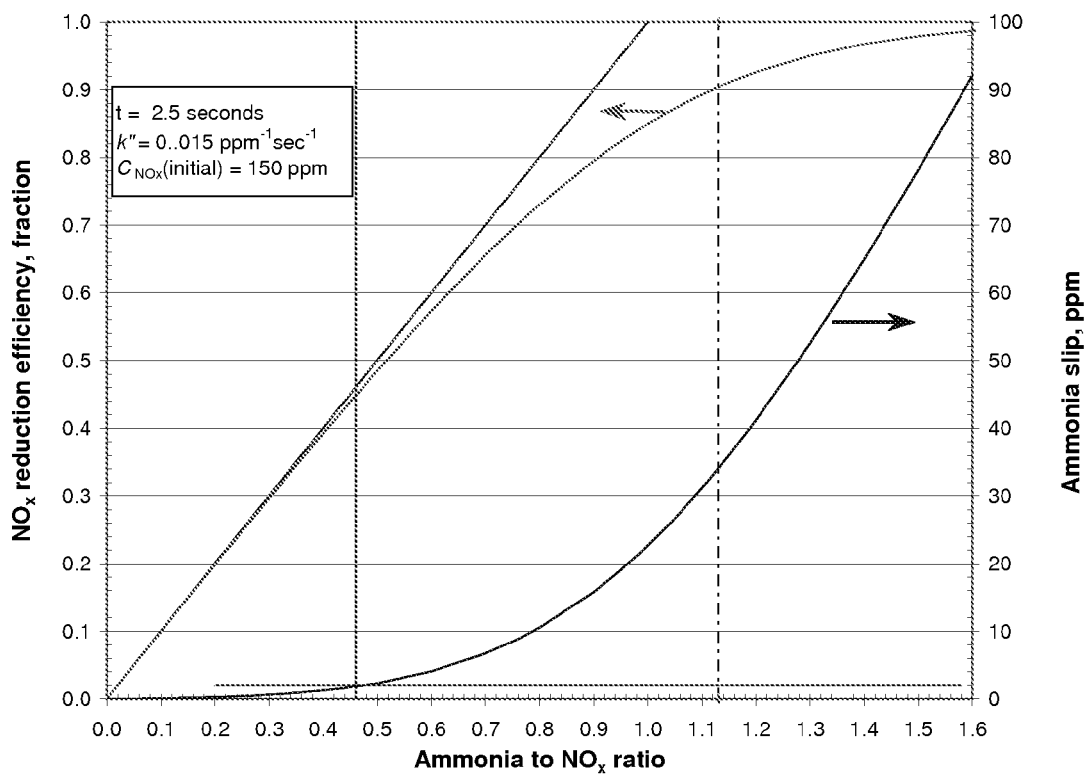
FIG. 4 is a graph illustrating the tradeoff between ammonia slip and $NO_x$ reduction across an ideal SCR where the catalyst activity has degraded 50% and the SCR is 50% plugged with fly ash.

Next, look at the situation where an SCR has lost half its activity, κ", and is also 50% plugged with fly ash. The following analysis applies. This partial pluggage would reduce the residence time, τ, by half. So, for these conditions the activity is 0.015 and the residence time is 2.5 seconds. This set of conditions is illustrated in FIG. 4.

Under these conditions, the $NO_x$ efficiency at an ammonia slip of 2 ppm is only about 50% and the ammonia stoichiometry had to be reduced to about 0.5 to maintain the slip at 2 ppm. To achieve 90% efficiency would require an ammonia stoichiometry of about 1.12 and an ammonia slip of approximately 34 ppm. But, since the cost of ammonia is only a small portion of the value of an equivalent amount of $NO_x$, there is certainly an economic incentive to use extra ammonia to compensate for the degradation or other technical shortcomings of the SCR. Here, the cost of ammonia would be \$10.40/hour to save the cost of \$108.80/hr in $NO_x$ allowance purchases.

The discussion above illustrates that many of the problems encountered in operating SCRs in the harsh environments of coal combustion can be ameliorated by increasing the ammonia usage in an economic fashion. Similar problems could, and are, encountered in various other combustion settings. The value of $NO_x$ allowances may be, in one instance, about 20 times the cost of an equivalent amount of ammonia. If it were not for certain extenuating problems discussed below, the $NO_x$ performance of the SCR could be maintained, even if an SCR experienced severe degradation, by simply increasing the ammonia flow as needed.

Figure 5:
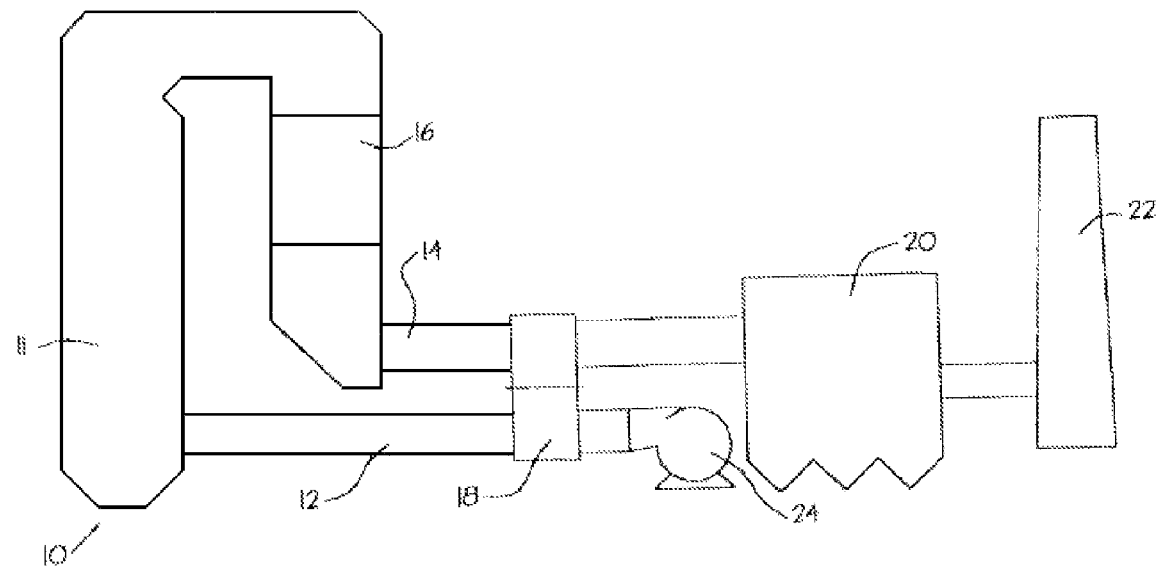
FIG. 5 is a schematic representation of a typical fossil fuel burning facility, without either SNCR or SCR systems, which illustrates the possible areas for inclusion of an apparatus according to the present invention.

Referring now to FIG. 5, there is schematically illustrated therein a power generation system 10, wherein fuel, such as coal, is burned in a boiler 11, for generating steam used in the generation of power. As illustrated, assembly 10 includes a fan 24 for delivering combustion air, via inlet duct 12, to boiler 11. Fuel is burned within boiler 11, which produces a flue gas containing $NO_x$, and other contaminants such as $SO_x$, particulate matter, etc. The flue gas flows from boiler 11, which typically includes an economizer section 16, through an exhaust flue 14, to a typical air pre-heater arrangement 18 and thence to an air cleaning arrangement for removing fly ash and other contaminants, for example a baghouse or an electrostatic precipitator generally indicated at 20. The "cleansed" flue gas then is discharged into the atmosphere via an exhaust stack 22.

The combustion of fuels produces a number of contaminants which must be addressed; however, for purposes of this invention, the discussion hereinafter will be primarily directed to $NO_x$ reduction. The reduction of $NO_x$ from stationary sources has become a critical issue in most industrialized nations. As a result, the technology associated with the control of nitrogen oxides ($NO_x$) from fuel fired generators has matured and expanded significantly.

$NO_x$ reduction processes are available through in-furnace $NO_x$ control (i.e., over-fire air, gas recirculation, reduced-excess air firing, gas mixing, low-$NO_x$ concentric tangential firing, staged combustion, fluidized-bed firing, and the like). In addition to, or instead of, so called "in-furnace" techniques, secondary reduction measures for $NO_x$ can be utilized. These include, but are not limited to, selective catalytic reduction (SCR) and selective non-catalytic reduction (SNCR). As discussed above, an SCR system uses a catalyst and an ammoniacal compound to convert $NO_x$ to molecular nitrogen, water vapor and sometimes molecular oxygen (see Equations (a) to (c) above).

An SNCR system does not require a catalyst for $NO_x$ reduction. It operates within a boiler at a much higher temperature range. Urea, ammonia, or other nitrogenous compounds can be used as a starting reagent, without the need of a catalyst to promote chemical reduction of $NO_x$ to nitrogen and water vapor.

Figure 6:
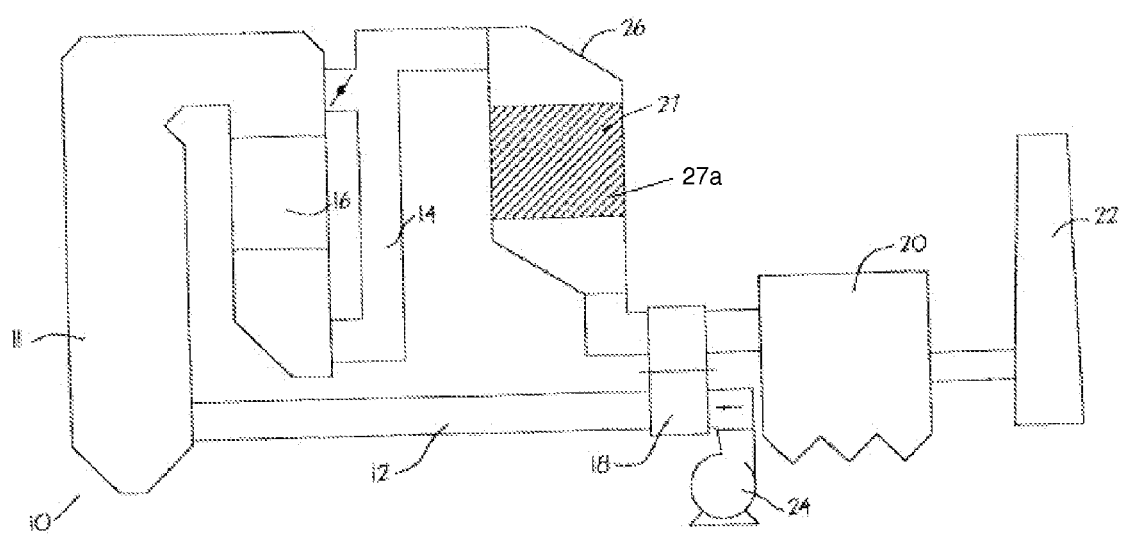
FIG. 6 is a schematic representation of a typical fossil fuel burning facility, of the type indicated in FIG. 5, but which includes an SCR system incorporated therein, the SCR system including an ammonia destruction catalyst section in accordance the present invention.

FIG. 6 illustrates one type of a power generation system 10 having an SCR section 26 located after economizer section 16. In accordance with one embodiment of the present invention, a portion or section (e.g., the last section) of catalyst 27 in SCR 26 is replaced with an ammonia destruction catalyst 27a. The SCR is then operated with an excess of ammonia in order to improve the $NO_x$ performance. This system is ideal for application to SCR catalysts and SCR reactors that are used in the electric utility industry on high sulfur, low alkalinity coals. This system can also be used in conjunction with any other SCR and/or SNCR application where a means for maintaining $NO_x$ reduction capability is desired even as the catalyst activity degrades over time.

For example, if a system designed to achieve 90% $NO_x$ reduction with three equivalent sections of SCR catalyst, was modified to replace the last section with ammonia destruction catalyst 27a, the flue gas residence time, τ, through the active deNOx catalyst would diminish by one third. With this reduced amount of catalyst the $NO_x$ removal efficiency would drop to 81% if the ammonia stoichiometry were adjusted to maintain the same 2 ppm ammonia slip. However, by simply raising the ammonia to $NO_x$ stoichiometry to 0.94, the efficiency would be restored to 90%. But the ammonia slip would rise to 6 ppm. Then, as the flue gas proceeds through ammonia destruction catalyst 27a the ammonia slip would diminish as the ammonia is converted to nitrogen and water.

Alternatively, the ammonia stoichiometry could be increased to 1.01 and the efficiency would increase to 94%, while the ammonia slip would rise to 10 ppm without the ammonia destruction catalyst system. In this instance, the efficiency of the ammonia destruction catalyst would have to be at least 80% to limit ammonia slip to 2 ppm or less past the ammonia destruction catalyst.

The proportion of SCR volume allotted to ammonia destruction catalyst versus SCR catalyst can be optimized for each specific application. Accordingly, the present invention is not limited to any ratio of SCR catalyst 27 to ammonia destruction catalyst 27*a* in an SCR.

By limiting the ammonia slip leaving the ammonia destruction catalyst, the potential for ammonium bisulfate fouling of downstream air heater 18 can be reduced while maximizing $NO_x$ reduction across the SCR.

Thus, the increase in the ammonia slip that occurs due to the increased use of ammonia relative to the increase in NOx removal efficiency is ameliorated through the use of an appropriately selected ammonia destruction catalyst.

Figure 7:
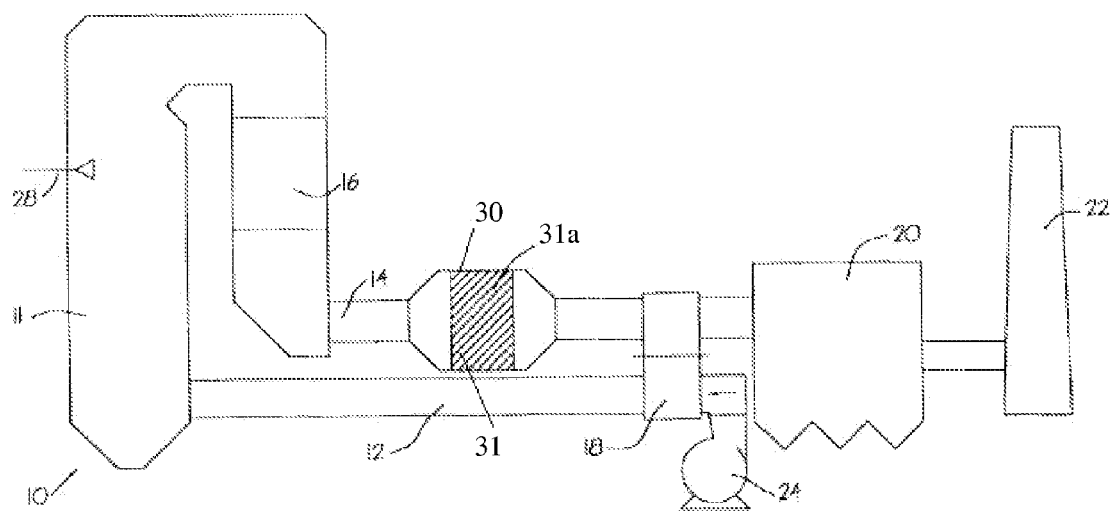
FIG. 7 is a schematic representation of a fossil fuel burning facility, also of the type indicted in FIG. 5, but which includes a hybrid $NO_x$ system (i.e. SNCR in conjunction with in-line SCR and/or one or more non-conventional alternative SCR sections), and where the one or more SCRs include an ammonia destruction catalyst section in accordance with the present invention.

FIG. 7 illustrates a power generation system 10 having an in-flue SCR section 30 and an SNCR section 28 that are used in combination to reduce unwanted $NO_x$ emissions. Furthermore, if desired, additional SCRs can be provided by catalyzing some of the elements of the heat transfer baskets (not shown) of air pre-heater 18 and also, if desired, by catalyzing sections (not shown) of electrostatic precipitator 20. Alternatively, SCR section 30 could be eliminated leaving just SNCR section 28.

In the case of the power generation system 10 of FIG. 7, a portion or section (e.g., the last section) of catalyst 31 in SCR 30 is replaced with an ammonia destruction catalyst 31*a*. Alternatively, since an SNCR 28 is present in this embodiment, catalyst 31 of SCR 30 could be completely replaced by an ammonia destruction catalyst 31*a*.

At this point it is to be noted that the present invention is not limited to any particular type of catalyst, or SCR or SNCR arrangement, or a certain set of specifics for the ammonia grid injections. It is to be understood that the discussion of the power plant herein is intended to be highly schematic in nature and is set forth in sufficient detail only as is necessary to understand, practice and enable the present invention. In an operating power plant there are typically many other systems, as well as alternative systems, that are not illustrated in this application; however, the present invention is compatible with such other systems, as will be recognized by those skilled in the art.

In still another embodiment of the present invention, an ammonia destruction catalyst section can be located in a power generation system after the particulate collection device for systems with highly alkaline ashes (not shown). In this embodiment, it may be suitable to integrate the ammonia destruction catalyst into one or more pulsed jet bag houses. In this instance, the ammonia destruction catalyst will operate at air heater flue gas exit temperatures rather than air heater flue gas inlet temperatures. Pulsed jet bag houses are known in the art (see, e.g., U.S. Pat. Nos. 5,540,897; 5,567,394; and 5,585,081 to Chu et al.), and a discussion herein is omitted for brevity.

The ammonia destruction catalyst of the present invention can be any suitable catalyst that enables ammonia to be broken down into nitrogen gas and water vapor. Suitable ammonia destruction catalysts include, but are not limited to, catalysts which have excellent activity for ammonia oxidation and low selectivity for $NO_x$. These may be similar catalysts to those used in SCRs but they may have been shown to work at lower temperatures than experienced in typical SCR applications.

Exemplary ammonia destruction catalysts suitable for selective catalytic oxidation of ammonia to benign products of nitrogen and water are comprised of two components: active constituents and catalyst support.

The active constituents comprise either a single or a combination of noble and transition metals at various metal to metal ratios. These combinations could be noble+noble, noble+transition, transition+noble, or transition+transition. The difference between noble+transition and transition+noble is the sequence and position of how each metal is introduced to the catalyst. Noble metals include Pt, Pd, Rh, Ru, Ag, and Au; the transition metals include Fe, Cu, Co, Ni, Zn, and Cd.

The catalyst support can comprise either a single or a combination of various zeolites and transition metal oxides. In this invention, zeolite can refer to, for example, ZSM-5 and/or TS-1, TS-2. However, the present invention is not limited to solely the aforementioned zeolite compounds. Rather other suitable zeolites could be used in conjunction with the present invention. Such compounds are known to those of skill in the art. The transition metal oxides include $TiO_2$, $Al_2O_3$, $ZrO_2$, or $SiO_2$.

In the present invention, various catalyst preparation methods can be employed. The active component can be introduced to the catalyst support by either of two preparation methods: ion-exchange and impregnation. The ion-exchange method is used to introduce a transition metal or a noble metal into the structure of a zeolite. Impregnation is the means to deposit a noble or a transition metal onto the catalyst or catalyst support.

For example, an ion-exchange preparation method can be applied to incorporate either a transition metal or a noble metal into the structure of ZSM-5, or both a transition metal and a noble metal can be introduced into ZSM-5 producing Tran-ZSM-5, or Noble-ZSM-5, or Tran+Noble-ZSM-5.

Another option is to use impregnation to deposit a noble or a transition metal onto the ZSM-5, Tran-ZSM-5, Noble-ZSM-5, Tran+Noble-ZSM-5, TS-1, and TS-2 resulting in Noble/ZSM-5, Noble/Tran-ZSM-5, Noble/Tran+Noble-ZSM5, Tran/ZSM-5, Tran/Noble-ZSM-5, Tran/Tran+Noble-ZSM-5, Noble/TS-1, Tran/TS-1, Noble/TS-2, Tran/TS-2, Noble+Tran/TS-1, and Noble+Tran/TS-2.

Alternatively, impregnation can be applied to deposit transition or noble metals onto transition metal oxides resulting in Tran/Tran, Noble/Tran, and Tran+Noble/Tran.

The catalyst support could also be mixture of ZSM-5 and TS-1, TS-2, or transition metal oxides such as $TiO_2$, $Al_2O_3$, $ZrO_2$, or $SiO_2$. In other words, the active components can be introduced onto a support, which is a mixture of ZSM-5 and TS-1, TS-2, $TiO_2$, $Al_2O_3$, $ZrO_2$, or $SiO_2$, by either ion-exchange or/and impregnation methods. The support mixture could also be a double or multiple-component mixture.

The ammonia destruction catalyst could also be a mixture (double or multiple-component mixture) of the above mentioned catalysts.

If desired, the ammonia destruction catalyst could also be provided, in addition to the active components and the catalyst support, with additives to enhance the number of ammonia absorption reservoirs. Any additive which produces acidic sites would provide such reservoirs. Suitable additives include, but are not limited to, additives containing tungsten, molybdenum, titanium sulfates, zirconium sulfates, aluminum sulfates, or suitable combinations thereof. These additional reservoirs assist or help the reaction (i.e., the destruction of ammonia into benign products of nitrogen and water). These additives can be applied to any of the above-identified ammonia destruction catalyst descriptions and combinations set forth above and thus, for the sake of brevity, will not be separately listed again.

Figure 8:
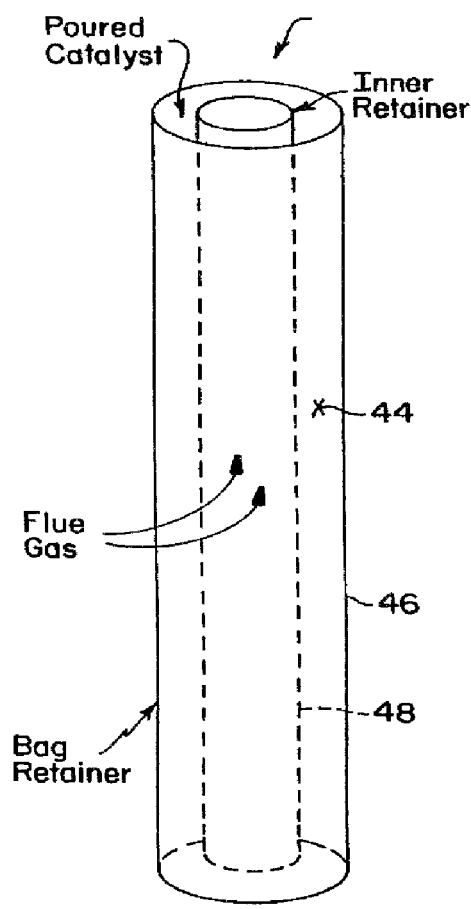
FIG. 8 is an illustration of a configuration of an ammonia destruction catalyst according to one embodiment of the present invention.

FIGS. 8 to 11 are four configurations of an ammonia destruction catalyst 27*a*/31*a* designed to be inserted into the systems 10 of FIGS. 6 and 7. Alternatively, the ammonia destruction catalyst designs of FIGS. 8 to 11 can be used in the above described bag house embodiment. FIG. 8 depicts an ammonia destruction catalyst bed 40 formed by two concentric cylinders 46, 48 each being constructed of a porous material such as a perforated metal plate. The width of the gap created between these two cylinders 46, 48 are at least about one inch, but probably less than about 3 inches. The ammonia destruction catalyst is placed in the space between cylinders 46, 48 preferably by pouring it into place as pellets.

Figure 9:
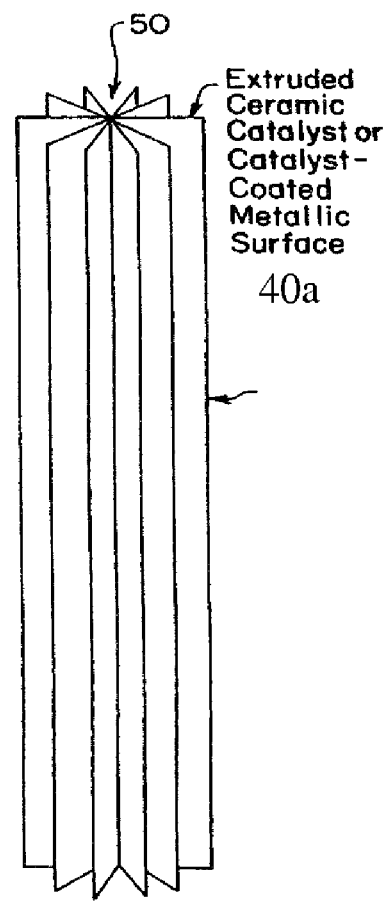
FIG. 9 is an illustration of a configuration of an ammonia destruction catalyst according to another embodiment of the present invention.

FIG. 9 depicts a radial plate-type ammonia destruction catalyst 40a configured to fit into a conventional bag retainer. The flue gas, upon entering the bag, flows up through wedge-shaped passages 50 coated with ammonia destruction catalyst 40a. Alternate embodiments of this configuration are either as an extruded monolith or metal plates coated with the catalyst.

Figures 10, 11:
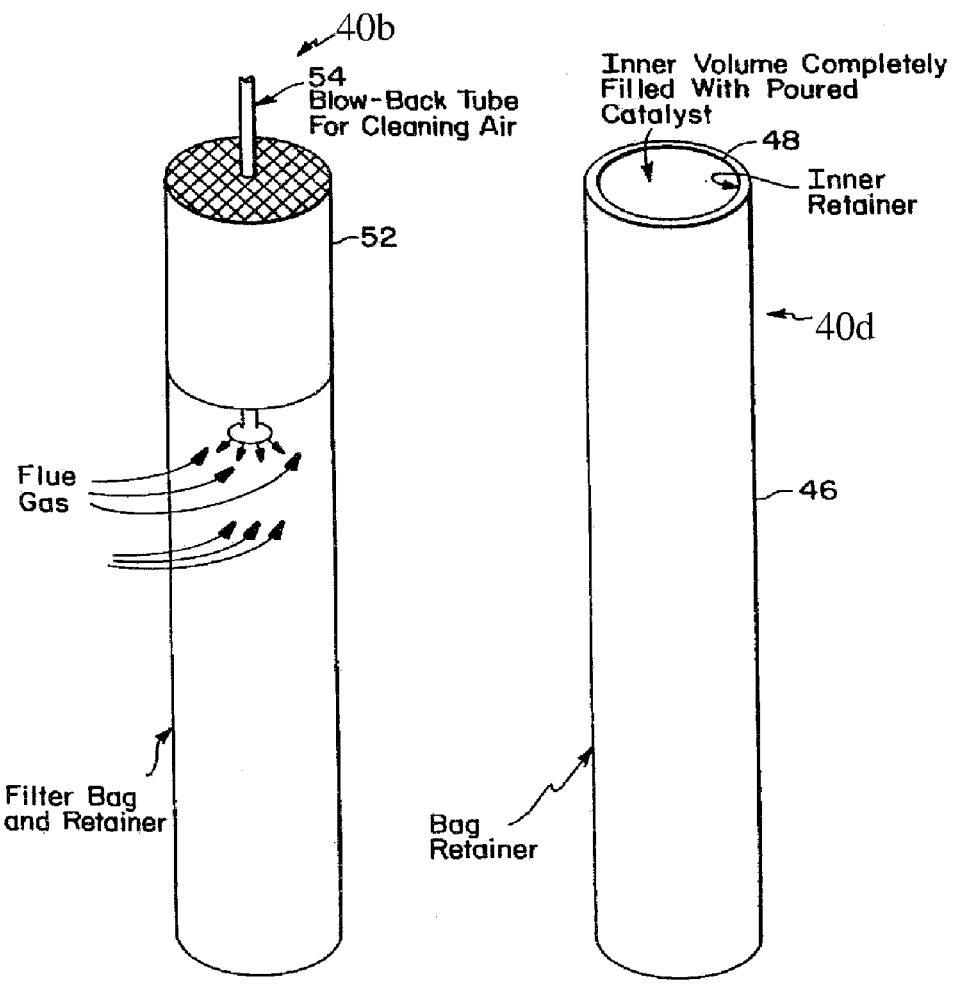
FIG. 10 is an illustration of a configuration of an ammonia destruction catalyst according to still another embodiment of the present invention.
FIG. 11 is an illustration of a configuration of an ammonia destruction catalyst according to yet another embodiment of the present invention.

FIG. 10 depicts a catalyst monolith 52 placed at the top of each bag and through which a bag blow-back tube 54 extends. The shape of the passages through monolith 52 is arbitrary, but honeycomb is the preferable shape. Alternately, the monolith catalyst 40b can be placed above a tube sheet immediately over each bag exit.

FIG. 11 depicts a configuration in which each bag consists of a doubled wall retainer 40d formed by two concentric cylinders, 46, 48 similar to the configuration shown in FIG. 8. However, in this embodiment, the catalyst is placed inside second cylinder 48. The gap between cylinders 46, 48 provides an unobstructed passage for blowback gas during the cleaning cycle. A check valve arrangement (not shown) prevents flue gas from entering the blow-back region.

The present invention is thus advantageous in that it permits the use of excess ammonia in the reduction of $NO_x$ while still enabling control of the ammonia slip generated from a $NO_x$ reduction system.

The control of ammonia slip is advantageous in that, ammonia, although not regulated at the Federal level for fuel fired power boilers as other prime pollutants are, possesses two properties that bring attention to it. First, it has a distinctive, sharp, irritating smell. Secondly, it can combine with several acid gases to produce stable, persistent aerosols that can cause visible haze issues with local communities. So, even in the absence of regulation, prudence dictates that measures are taken to minimize ammonia emissions. Even in the absence of any concern for ammonia emissions, plant operators are demanding ever lower ammonia slip to ameliorate operating problems with the equipment downstream of the SCR.

In conventional SCR installations the SCR must be made larger to achieve 2 ppm ammonia slip than it would otherwise have to be if 5 ppm ammonia slip were allowed. Therefore, the conventional wisdom and practice is that the lower the ammonia slip requirement, the larger the SCR that will be required. The present invention permits one to break away from this dependency. An SCR can be made a third smaller, or more, and achieve the same $NO_x$ efficiency with less ammonia slip than by the conventional method.

Because of the variability, both spatially and temporally in $NO_x$ concentration and flow, SCRs are seldom if ever designed to achieve better than 90% $NO_x$ efficiency because to do so would create unacceptable ammonia slip. The present invention also allows this limitation to be circumvented. Accordingly, the present invention permits the design of SCRs potentially capable of 95% to 98% or better $NO_x$ reduction without having to worry about unacceptable ammonia slip.

Thus, the use of an ammonia destruction catalyst in accordance with the present invention (i.e., the placement of an ammonia destruction catalyst at any point downstream of the ammonia injection point), permits the design of an SCR and/or SNCR with increased efficiency according to the methods of operation described above, while permitting a simultaneous reduction in the amount of ammonia slip.

The need for intensive premixing of flue gases upstream of SCRs can be reduced or possibly eliminated by increasing the ammonia/$NO_x$ stoichiometry to levels above those conventionally used to provide a greater likelihood that all portions of the flue gas entering the SCR de-$NO_x$ catalyst have ample ammonia to drive reaction (a) to completion.

The present invention thus permits different sizing and/or operating criteria for the system designer or the plant operator to utilize. In other words, new design and operating procedures are available to achieve increased $NO_x$ removal efficiency from an emissions control portion of a fossil fuel fired boiler while controlling ammonia slip. Now, the designer or the plant operator is no longer constrained by ammonia slip concerns or limitations which previously limited their options to control $NO_x$ emissions using this equipment. A desired $NO_x$ removal efficiency for the $NO_x$ reduction means can be determined and an excess stoichiometric ratio of ammonia to $NO_x$ to achieve the desired $NO_x$ removal efficiency, regardless of the amount of ammonia slip from the $NO_x$ removal means that would otherwise be produced, can be employed. The ammonia destruction catalyst downstream of the ammonia injection point(s) permits the use of the increased stoichiometric ratio of ammonia to $NO_x$ without a corresponding increase in ammonia slip.

In another embodiment, the present invention permits a designer to modify, change and/or alter the amount of ammonia used to reduce the amount of $NO_x$ present in a flue gas in real-time. That is, the amount of ammonia supplied via one or more injection points within a flue carrying $NO_x$-containing flue gases can be adjusted continually to permit the removal of 90% or more of the $NO_x$ contained in such flue gas. In still another embodiment the removal rate for the $NO_x$ can as high as about 95%, or even about 98%. In some embodiments, it may be desirable to even use a stoichiometric excess of ammonia. That is, the ratio of ammonia to $NO_x$ can in some embodiments exceed a one to one ratio.

While specific embodiments of the present invention have been shown and described in detail to illustrate the application and principles of the invention, it will be understood that it is not intended that the present invention be limited thereto and that the invention may be embodied otherwise without departing from such principles. For example, the present invention may be applied to new steam generator or power plant construction involving SNCRs or SCRs, or to the replacement, repair or modification of existing steam generators or power plants where such SNCRs or SCRs are either modified or added as a retrofit in order to achieve $NO_x$ reduction. In some embodiments of the invention, certain features of the invention may sometimes be used to advantage without a corresponding use of the other features. Accordingly, all such changes and embodiments properly fall within the scope of the following claims.

What is claimed is:

1. A method for continuously controlling $NO_x$ removal efficiency in an emissions control system for a boiler in response to changes in the boiler operating parameters while controlling ammonia slip, the method comprising the steps of:

providing a flue for conveying flue gases from the boiler to a stack for discharge;

positioning a $NO_x$ reduction system along the flue between the boiler and the stack, the $NO_x$ reduction system being constructed so as the remove at least $NO_x$ from the flue gas along the flue, wherein the $NO_x$ reduction system relies in whole, or in part, upon ammonia introduced into the $NO_x$ reduction system via at least one ammoniacal compound injection point;

varying, in response to the changes in boiler operating parameters, a stoichiometric ratio of ammonia to $NO_x$ introduced into the $NO_x$ reduction system to achieve a desired level of $NO_x$ removal regardless of the amount of ammonia slip from the $NO_x$ reduction system; and positioning an ammonia reduction system downstream of the $NO_x$ reduction system, wherein the ammonia reduction system contains at least one ammonia destruction catalyst and the ammonia destruction catalyst permits the $NO_x$ reduction system to be operated to achieve a desired level of $NO_x$ removal without a corresponding increase in ammonia slip downstream of the ammonia reduction system.

2. The method of claim 1, wherein the ammonia destruction catalyst comprises one or more active constituents that include a single or a combination of noble and transition metals; one or more catalyst supports that include a single or a combination of zeolites and transition metal oxides; one or more additives containing tungsten, molybdenum, titanium sulfates, zirconium sulfates, or aluminum sulfates; or suitable combinations thereof.

3. The method of claim 1, further comprising one or more processes for removing $SO_x$ and particulates from the flue gases.

4. The method of claim 1, wherein the amount of $NO_x$ removed from the flue gases is at least about 90%.

5. The method of claim 1, wherein the amount of $NO_x$ removed from the flue gases is at least about 95%.

6. The method of claim 1, wherein the amount of $NO_x$ removed from the flue gases is at least about 98%.

7. A method for achieving increased $NO_x$ removal efficiency in an emissions control system for a boiler while controlling ammonia slip, the method comprising the steps of:

providing a flue for conveying flue gases from the boiler to a stack for discharge;

positioning a $NO_x$ reduction system comprising at least one selective catalytic reduction system along the flue between the boiler and the stack, the $NO_x$ reduction system being constructed so as the remove at least $NO_x$ from the flue gas conveyed along the flue, wherein the $NO_x$ reduction system relies in whole, or in part, upon ammonia introduced into the $NO_x$ reduction system via at least one ammoniacal compound injection point;

determining a desired $NO_x$ removal efficiency for the at least one selective catalytic reduction system and providing an excess stoichiometric ratio of ammonia to $NO_x$ to achieve the desired $NO_x$ removal efficiency regardless of the amount of ammonia slip from the $NO_x$ removal system that would otherwise be produced; and positioning an ammonia reduction system downstream of the one or more selective catalytic reduction systems, wherein the ammonia reduction system contains at least one ammonia destruction catalyst and the ammonia destruction catalyst permits the one or more selective catalytic reduction systems to be operated at the excess stoichiometric ratio of ammonia to $NO_x$ to achieve increased $NO_x$ removal efficiency without a corresponding increase in ammonia slip downstream of the ammonia reduction system.

8. The method of claim 7, wherein the ammonia destruction catalyst comprises one or more active constituents that include a single or a combination of noble and transition metals; one or more catalyst supports that include a single or a combination of zeolites and transition metal oxides; one or more additives containing tungsten, molybdenum, titanium sulfates, zirconium sulfates, or aluminum sulfates; or suitable combinations thereof.

9. The method of claim 7, further comprising one or more processes for removing $SO_x$ and particulates from the flue gases.

10. The method of claim 7, wherein the amount of $NO_x$ removed from the flue gases is at least about 90%.

11. The method of claim 7, wherein the amount of $NO_x$ removed from the flue gases is at least about 95%.

12. The method of claim 7, wherein the amount of $NO_x$ removed from the flue gases is at least about 98%.

* * * * *